(12) United States Patent
Ogiso

(10) Patent No.: US 7,066,136 B2
(45) Date of Patent: Jun. 27, 2006

(54) OUTPUT CONTROL SYSTEM FOR INTERNAL COMBUSTION ENGINE

(75) Inventor: Makoto Ogiso, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/067,645

(22) Filed: Feb. 28, 2005

(65) Prior Publication Data

US 2005/0199220 A1    Sep. 15, 2005

(30) Foreign Application Priority Data

Mar. 10, 2004    (JP) .............................. 2004-067162

(51) Int. Cl.
*F02D 13/06* (2006.01)
(52) U.S. Cl. ................................. 123/198 F
(58) Field of Classification Search ............ 123/198 F, 123/198 DB, 198 DC, 90.11
See application file for complete search history.

(56) References Cited

U.S. PATENT DOCUMENTS

| | | | | |
|---|---|---|---|---|
| 5,374,224 A | * | 12/1994 | Huffmaster et al. ......... | 477/181 |
| 5,540,633 A | * | 7/1996 | Yamanaka et al. .......... | 477/107 |
| 6,098,592 A | * | 8/2000 | Hess et al. .................. | 123/350 |
| 6,651,619 B1 | * | 11/2003 | Ogiso ..................... | 123/339.11 |
| 6,752,121 B1 | * | 6/2004 | Rayl et al. ................ | 123/198 F |
| 6,830,536 B1 | * | 12/2004 | Tanaka et al. .............. | 477/110 |
| 6,910,458 B1 | * | 6/2005 | Oki ......................... | 123/198 F |
| 6,928,982 B1 | * | 8/2005 | Albertson et al. .......... | 123/399 |
| 6,950,739 B1 | * | 9/2005 | Matsubara et al. ......... | 701/103 |

FOREIGN PATENT DOCUMENTS

| | | |
|---|---|---|
| JP | A-08-014074 | 1/1996 |
| JP | A-2000-008819 | 1/2000 |
| JP | A-2000-087783 | 3/2000 |
| JP | A-2001-159326 | 6/2001 |

\* cited by examiner

*Primary Examiner*—Noah P. Kamen
*Assistant Examiner*—Jason Benton
(74) *Attorney, Agent, or Firm*—Oliff & Berridge, PLC

(57) ABSTRACT

An intake electromagnetic driving valve and an exhaust electromagnetic driving valve are provided which use electromagnetic force to drive an intake valve and an exhaust valve, respectively. In step 102, the ratio between the number of combustion execution cycles and the number of combustion halts is set to obtain a desired target output value. Output control patterns that each consist of combustion execution timing equivalent to the required number of combustion execution cycles, and combustion halt timing equivalent to the required number of combustion halts are set in step 106, 114. In steps 108 to 112, or 118 to 122, in accordance with the output control patterns, whether combustion is to be executed is set with respect to the explosion timing that arrives in each cylinder in order.

10 Claims, 6 Drawing Sheets

*1 : Recompression
*2 : Re-expansion

*1 : Recompression
*2 : Re-expansion

OUTPUT CONTROL SYSTEM FOR INTERNAL COMBUSTION ENGINE

BACKGROUND OF THE INVENTION

1. Field of the Invention

The present invention relates to output control systems of internal combustion engines, and more particularly, to an output control system of an internal combustion engine that controls output by halting internal combustions of cylinders.

2. Background Art

Japanese Patent Laid-open No. 2001-159326, for example, discloses a related technique for halting the combustions inside a part of the cylinders in an internal combustion engine which activates an electromagnetic valve mechanism to control output by controlling the closing timing of intake valves. This technique halts the combustions inside a part of the cylinders in the region where output is not controllable to a target value by controlling the closing timing of intake valves.

Including the above-mentioned document, the applicant is aware of the following documents as a related art of the present invention.

[Patent Document 1]
Japanese Patent Laid-open No. 2001-159326
[Patent Document 2]
Japanese Patent Laid-open No. 2000-87783
[Patent Document 3]
Japanese Patent Laid-open No. 2000-8819
[Patent Document 4]
Japanese Patent Laid-open No. Hei 8-14074

The conventional output control techniques that use cylinder halts, such as the related technique described above, are based on the concept that the number of cylinders to be halted is changed in increments of one cycle of the internal combustion engine in order to obtain a target output value. With these techniques, however, the fine control of output that uses cylinder halts is not possible. That is to say, if the output obtained when all cylinders generate positive work is taken as 100%, the output can only be controlled to either 25%, 50%, or 75%, for a four-cylinder internal combustion engine, for instance. This means that the conventional techniques make it difficult to conduct the fine control of output that uses cylinder halts, and make such control of output less feasible for a smaller number of cylinders, in particular.

SUMMARY OF THE INVENTION

The present invention was made in order to solve the above problems, and an object of the invention is to provide the output control system of an internal combustion engine that makes it possible, without being limited by the number of cylinders of the internal combustion engine, to implement the fine control of output that uses cylinder halts.

The above object is achieved by an output control system of an internal combustion engine which includes a variable-valve actuator for changing valve-opening characteristics of a valve body. A control pattern setting unit is provided for setting output control patterns that each consist of combustion execution timing equivalent to a required number of combustion execution cycles, and combustion halt timing equivalent to a required number of combustion halts. An order-of-combustion setting unit which, in accordance with the output control patterns set by the control pattern setting means, sets whether combustion is to be executed with respect to the explosion timing that arrives in each cylinder in order is also provided. A target output setting means is further provided for setting a ratio between the required number of combustion execution cycles and the required number of combustion halts such that a desired target output is obtained.

Other objects and further features of the present invention will be apparent from the following detailed description when read in conjunction with the accompanying drawings.

BEST MODE OF CARRYING OUT THE INVENTION

Figure 1:
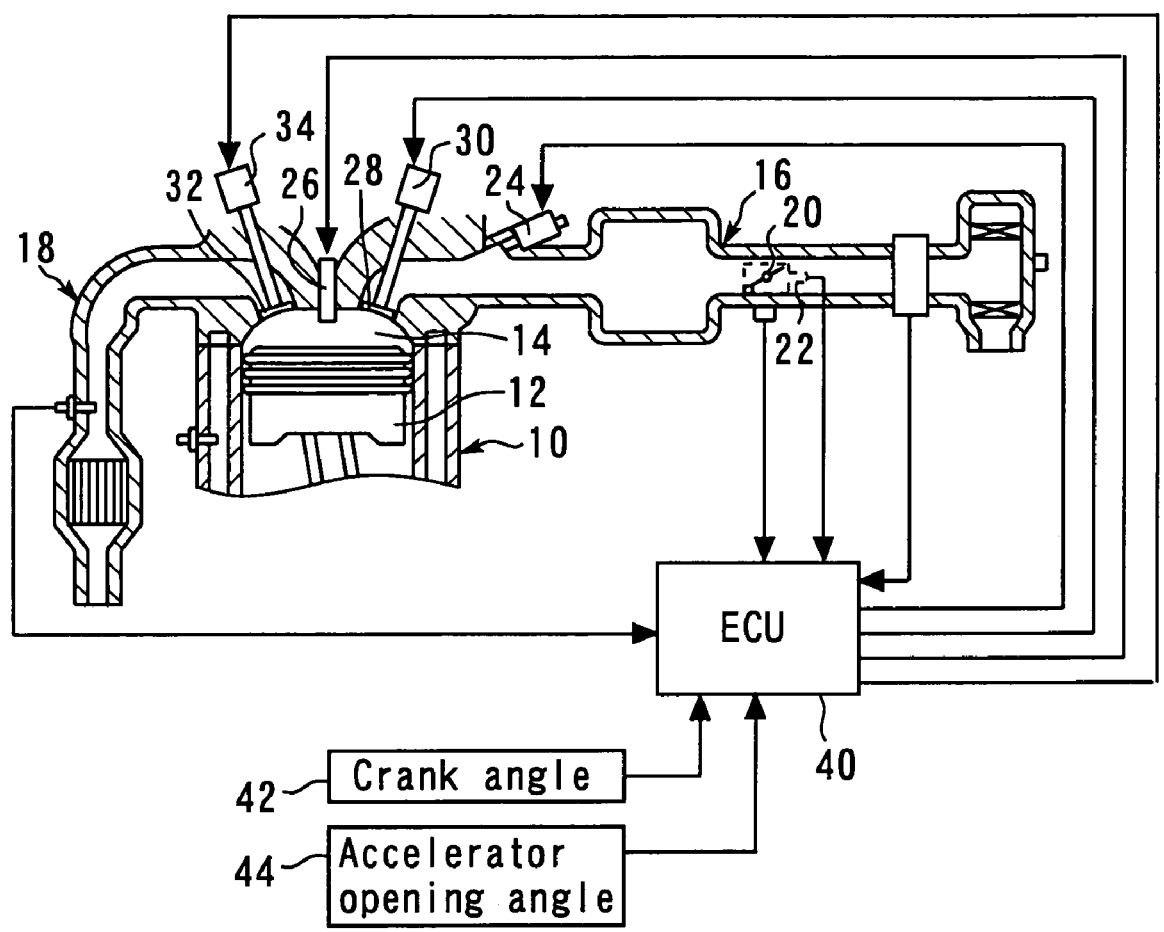
FIG. 1 is a diagram explaining a configuration of a first embodiment of the present invention.

Preferred embodiments of the present invention will be described hereunder with reference to the accompanying drawings. The common elements in each drawing are each assigned the same reference numeral, and the duplicate description is omitted.

First Embodiment

FIG. 1 is a diagram explaining a configuration of a first embodiment of the present invention.

The configuration shown in FIG. 1 includes an internal combustion engine 10. The internal combustion engine 10 has a piston 12 in a cylinder. The piston 12 can reciprocate inside the cylinder. Inside the cylinder of the internal combustion engine 10, a combustion chamber 14 is formed above the piston 12. Also, an intake air passageway 16 and an exhaust passageway 18 communicate with the combustion chamber 14.

A throttle valve 20 is provided in the intake air passageway 16. The throttle valve 20 is an electronic control throttle valve that can control a throttle angle TA independently of an accelerator-opening angle. A throttle sensor 22 that detects throttle angle TA is disposed near the throttle valve 20. A fuel injection valve 24 for injecting fuel into an air intake port of the internal combustion engine 10 is disposed on the downstream side of the throttle valve 20. An ignition plug 26 is built in the combustion chamber 14.

The internal combustion engine 10 has an intake electromagnetic driving valve 30 for driving an intake valve 28 by electromagnetic force, and an exhaust electromagnetic driving valve 34 for driving an exhaust valve 32 by electromagnetic force. The intake electromagnetic driving valve 30 and the exhaust electromagnetic driving valve 34 can greatly vary operating angles of the intake valve 28 and the exhaust valve 32, respectively.

The system shown in FIG. 1 includes an electronic control unit (ECU) 40. In addition to the throttle sensor 22 and other elements, a crank angle sensor 42 for detecting an engine speed, and an accelerator opening angle sensor 44 for detecting the accelerator opening angle are connected to the ECU 40. The above-mentioned fuel injection valve 24, ignition plug 26, intake electromagnetic driving valve 30, and exhaust electromagnetic driving valve 34 are controlled by the ECU 40.

Next, the output control technique for the internal combustion engine 10, used in the present embodiment, is described below with reference to FIGS. 2 and 3.

Figure 2:
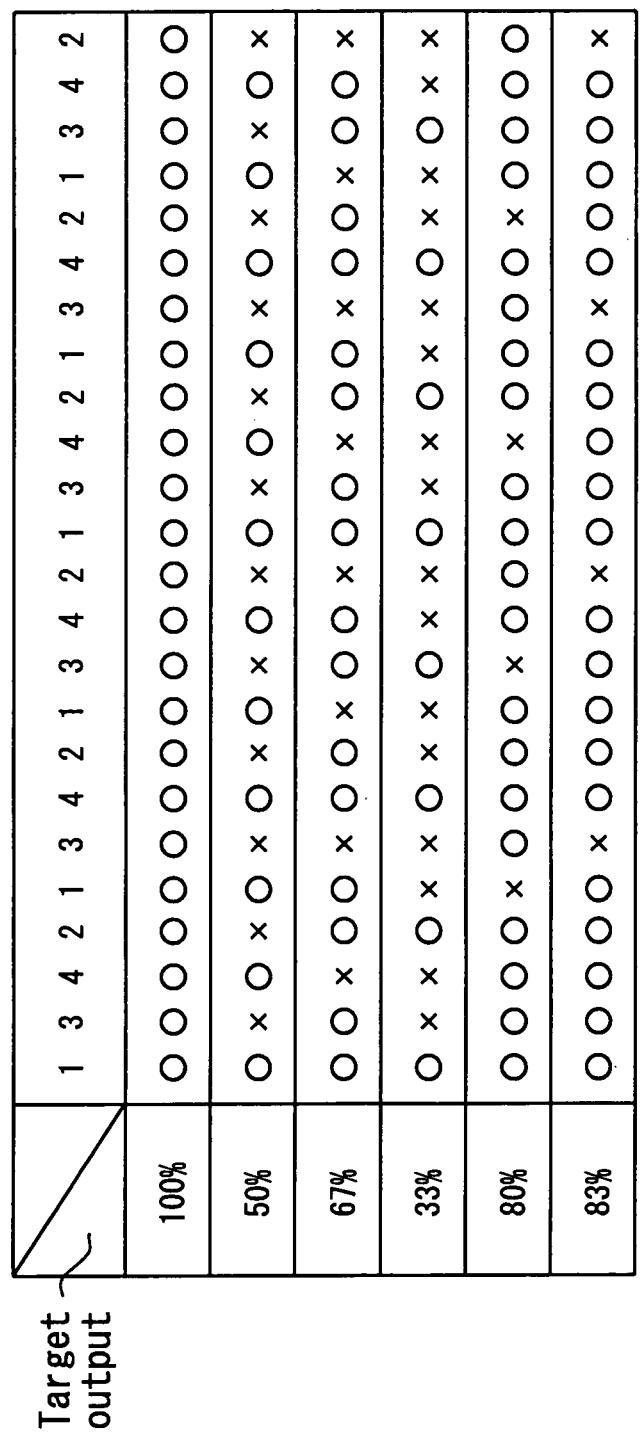
FIG. 2 is a diagram explaining the output control technique used to control an output of the internal combustion engine shown in FIG. 1.

FIG. 2 is a diagram explaining the output control technique used to control an output of the internal combustion engine 10 shown in FIG. 1. The explanation, for its convenience's sake, assumes that the internal combustion engine 10 is a four-cylinder engine. According to this assumption, inside the internal combustion engine 10, explosion timing arrives twice per revolution of the engine. The train of numerals, "1342 . . . ", shown in FIG. 2, indicates the order in which the above explosion timing arrives in each cylinder (the order is equivalent to the order of ignition in an ordinary internal combustion engine). In connection with the explosion timing that arrives in each cylinder in order, symbol "o" in FIG. 2 indicates that combustion is executed, and symbol "x" indicates that combustion is not executed, i.e., that fuel injection and ignition are halted.

The system according to the present embodiment controls the output of the internal combustion engine 10 to achieve a target output value. Such output control is implemented by changing, independently of the number of cylinders in the internal combustion engine 10, a ratio between the number of combustion execution cycles and the number of combustion halts, with respect to the explosion timing that arrives in each cylinder in the above order of ignition. In other words, this system repeatedly performs the process of executing an "m" number of combustions in succession and then halting the combustion an "n" number of times in succession, and make arbitrary changes to the above values of "m" and "n", whereby the system conducts output control based on an average value of the torques generated by all cylinders during explosion timing intervals of an "m+n" number of explosions. Hereinafter, the series of patterns set in FIG. 2 to determine the target output value, these patterns each consisting of symbols "o" and "x", are referred to as "output control patterns".

Specific examples of the target output values listed in FIG. 2 are described below. First, for a target output of 100%, i.e., when all cylinders are required to generate maximum torque, combustion is executed in all explosion timings that arrive.

Next, for a target output of 50%, one combustion execution cycle alternates with one combustion-halt. In this case, combustion is executed once for every two arrivals of explosion timing and the output of the internal combustion engine 10 can be adjusted to 50% of the output obtained when all cylinders are operated.

Next, for a target output of 67%, the process of conducting combustion twice in succession and then halting the combustion once is repeatedly performed. In this case, the combustion is actually executed twice for every three arrivals of explosion timing and the output of the internal combustion engine 10 can be adjusted to 67% of the output obtained when all cylinders are operated. Although examples of 33%, 80%, and 83% are also shown in FIG. 2, detailed description of these examples is omitted since the concept adopted therefor is the same as that of 67%. The target output values listed in FIG. 2 are examples, and a desired target output value can be achieved by setting the number of symbols "o" and "x" to any value other than the listed ones.

The conventional internal combustion engines that control output by halting cylinders have been such that the internal combustion engine adjusts the output by halting the combustions in specific cylinders in one cycle of the engine (one cycle here means, for a four-cylinder engine, for instance, the series of cycles formed by the ignition order consisting of 1, 3, 4, 2). Under the conventional concept of internal combustion engines that are based on cylinder halts, output has been adjustable only to the percentage obtained by dividing 100 by the number of cylinders which the internal combustion engine has. More specifically, for a four-cylinder engine, for instance, changing the number of cylinders to be halted, to one, two, or a maximum of three, has allowed output to be adjusted only to 75%, 50%, or 25%, respectively, of the output obtained by operating all cylinders. The output control technique of the present embodiment, however, allows output control for a desired target output value. That is, the ratio between the number of combustion execution cycles and the number of combustion halts is changed independently of the number of cylinders in the internal combustion engine 10, with respect to the explosion timing that arrives in each cylinder in order.

Next, a preferred example of an operating method which uses the above output control technique for the internal combustion engine 10 is described below. This operating method is implemented as follows: valve timing is set in order for an ideal amount of air to be taken into cylinders and so as to obtain the best possible combustion state, and output control based only on the ratio between the number of combustion execution cycles and the number of combustion halts is conducted using the output control technique of the present embodiment, without involving throttle angle adjustment or valve timing control.

In such an operating method, when attention is focused only on the cylinders where combustion is being executed, each of these cylinders is continually generating a 100% torque. When attention is focused on all cylinders provided in the internal combustion engine 10, changing the ratio between the number of combustion execution cycles and the number of combustion halts allows control for an output commensurate with that ratio. Use of this method allows the output of the internal combustion engine 10 to be controlled in a wide range and finely, while, at the same time, maintaining highly efficient operation of individual cylinders.

Figure 3:
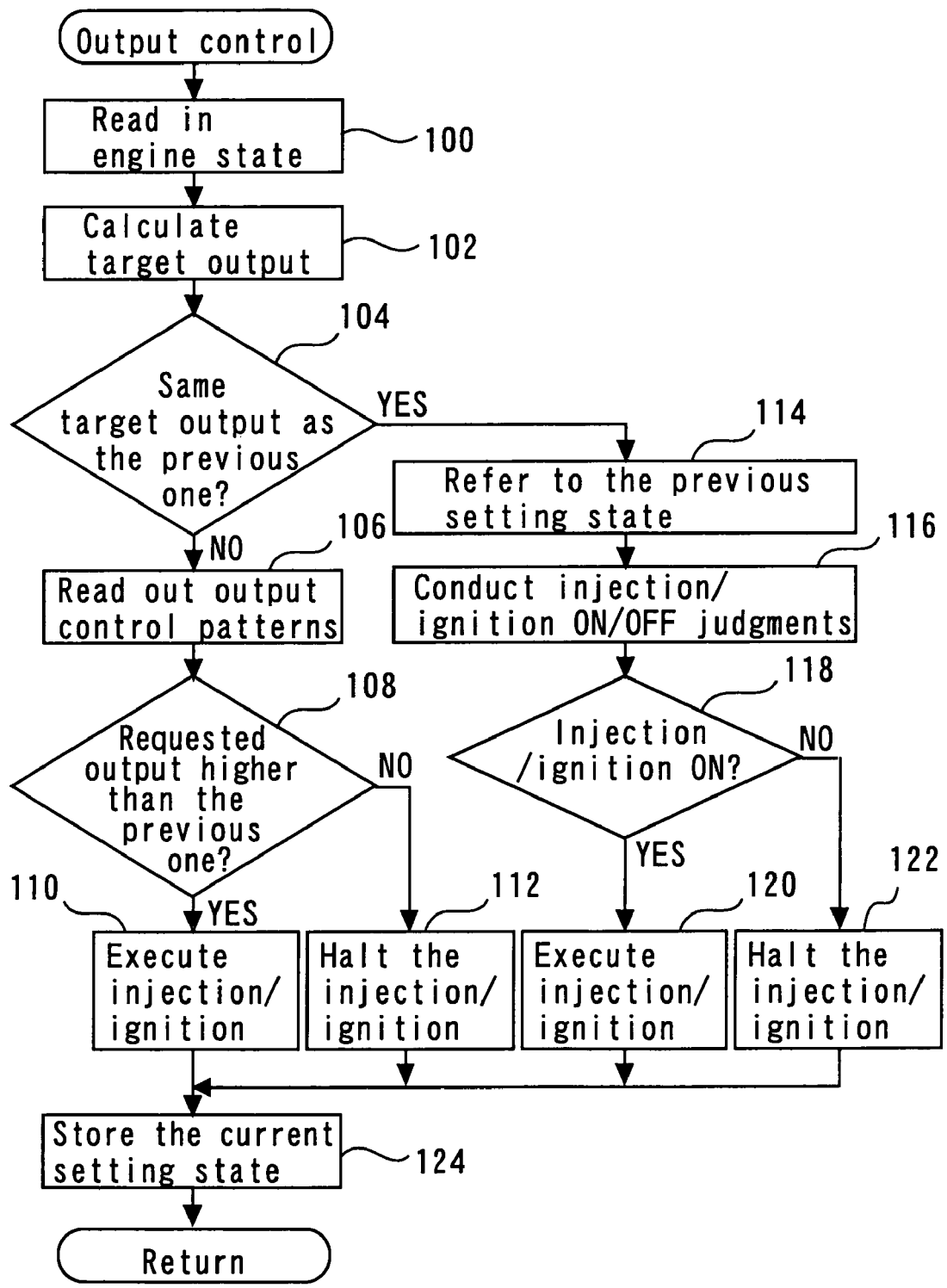
FIG. 3 is a flowchart illustrating a routine that is executed in the first embodiment of the present invention.

FIG. 3 is a flowchart of the output control routine that the ECU 40 shown in FIG. 1 executes to implement the above functions. FIG. 3 assumes that this routine is executed in each cylinder of the internal combustion engine 10 with each arrival of required timing before fuel injection occurs, i.e., with each arrival of required timing before an exhaust stroke is started. Hereinafter, the particular required timing is referred to as the "ON/OFF judgment timing" for judging whether fuel injection/ignition is in an execution or halt state.

In the routine of FIG. 3, a current operating state of the internal combustion engine 10 is read first (step 100). Next, a target output is calculated from the operating state of the internal combustion engine 10 (step 102).

After this, it is judged in step 104 whether the target output that was calculated by above process step 102 is the same as the target output obtained during the previous process cycle of ECU40.

If, as a result, the current target output is judged not to be the same as the previous one, new output control patterns are read out in step 106. Such output control patterns as shown in FIG. 2, i.e., output control patterns each consisting of the required number of combustion execution cycles and combustion halts that is associated with a target output, are prestored within the ECU 40. In this step, the output control patterns are updated to those associated with the target output that was calculated by above step 102.

Next, it is judged in step 108 whether the current target output is required to be higher than the previous target output.

If it is judged as a result that the current target output is required to be higher than the previous one, fuel injection and ignition are conducted in step 110 in a cylinder associated with the current process cycle of ECU 40. That is to say, in this step, when output is controlled in accordance with the output control patterns that have been updated during the current process cycle, execution of these patterns is started from execution of combustion since an output higher than the previous one is requested. More specifically, for example, if the target output is to be changed from 67% to 75%, order of execution of the new output control patterns is set to obtain a symbol pattern of "oooxoox . . . ", not "xooxooo . . . ". When the target output is switched to the high-load side, actual output can be changed more smoothly by such setting.

Conversely, if, in above step 108, a request for an output higher than the previous one is judged not to be established, fuel injection and ignition are halted in step 112, for a cylinder associated with the current process cycle. That is to say, in this step, when output is controlled in accordance with the output control patterns that have been updated during the current process cycle, execution of these patterns is started from a halt of combustion since an output lower than the previous one is requested. More specifically, for example, if the target output is to be changed from 50% to 33%, order of execution of the new output control patterns is set to obtain a symbol pattern of "xxoxxo . . . ", not "oxxoxx . . . ". When the target output is switched to the low-load side, a more natural sense of deceleration can be generated by such setting.

Also, in the routine of FIG. 3, if, in above step 104, the current target output is judged to be the same as the previous one, a setting state of the previous process cycle is read out in step 114. More specifically, it is confirmed for what number "o" or "x" in either target output control pattern a cylinder associated with the previous explosion timing is set.

Next, it is judged in step 116 whether fuel injection and ignition are in an ON state or an OFF state. In this step, whether fuel injection and ignition are to be executed or halted for a cylinder associated with the current process cycle is determined in accordance with the setting state of the previous process cycle.

If judgment results in above step 116 indicate that both fuel injection and ignition are in an ON state (step 118), fuel injection and ignition are executed in the current process cycle (step 120). Conversely, if the judgment results indicate that fuel injection and ignition are in an OFF state, both are halted in the current process cycle (step 122).

Next, the current setting state is stored in step 124. More specifically, a position of the current process cycle in the output control patterns that have been used this time is stored and then referred to during the next process cycle.

According to the above-described routine of FIG. 3, the output of the internal combustion engine 10 can be controlled for a desired target output value by changing the ratio between the number of combustion execution cycles and that of combustion halts, to a desired ratio.

In the first embodiment described above, when the target output value is judged to differ from that of the previous process cycle, if an output higher than the previous one is requested, use of the updated output control patterns is started from the ON states (marked as "o") of the fuel injection and ignition. Conversely, if an output lower than the previous one is requested, the use of the output control patterns is started from the OFF states (marked as "x") of the fuel injection and ignition. However, when the target output is changed and the updated output control patterns are executed, a starting position of the process cycle in these output control patterns is not limited to the above and may be properly changed allowing for factors such as the operating state of the internal combustion engine and what strokes the other cylinders are executing.

Additionally, in the first embodiment described above, the target outputs shown as specific examples in FIG. 2 are realized by using the number of combustion execution cycles (the number of "o" symbols) and the number of combustion halts (the number of "x" symbols) in respective minimum combinations (e.g., "oxox . . . " for a target output of 50%). The output control technique of the present invention is not limited to these examples of combinations. That is, provided that a target ratio is realized, multiples of the minimum number of "o" and "x" symbols for achieving the ratio may be combined with each other (e.g., "ooxxooxx . . . " for a target output of 50%).

In the first embodiment described above, the ECU 40 realizes the "control pattern setting unit", "order-of-combustion setting unit", and "target output setting unit" mentioned in the first aspect of the present invention, by performing above process step 106 or 114, above process steps 116 to 120 or 108 to 112, and above process step 102, respectively.

In the first embodiment described above, the ECU 40 also realizes the "combustion execution unit" and "combustion halting unit" mentioned in the third aspect of the present invention, by performing above process steps 108 and 110, and above process steps 108 and 112, respectively.

Second Embodiment

Next, a second embodiment of the present invention is described below with reference to FIGS. 4 and 5.

A system of the present embodiment is realized according to the system configuration of the first embodiment.

In an internal combustion engine 10, the number of explosion strokes per unit time increases with an increase in engine speed. Accordingly, when combustion is halted, a combustion halt interval becomes shorter as the engine speed increases. In a high engine speed region, therefore, an increase in the number of combustion halts does not significantly affect drivability. For this reason, in the system of the present embodiment, a region in which output control is conducted only by cylinder halting is changed according to the particular operating state of the internal combustion engine.

Figure 4:
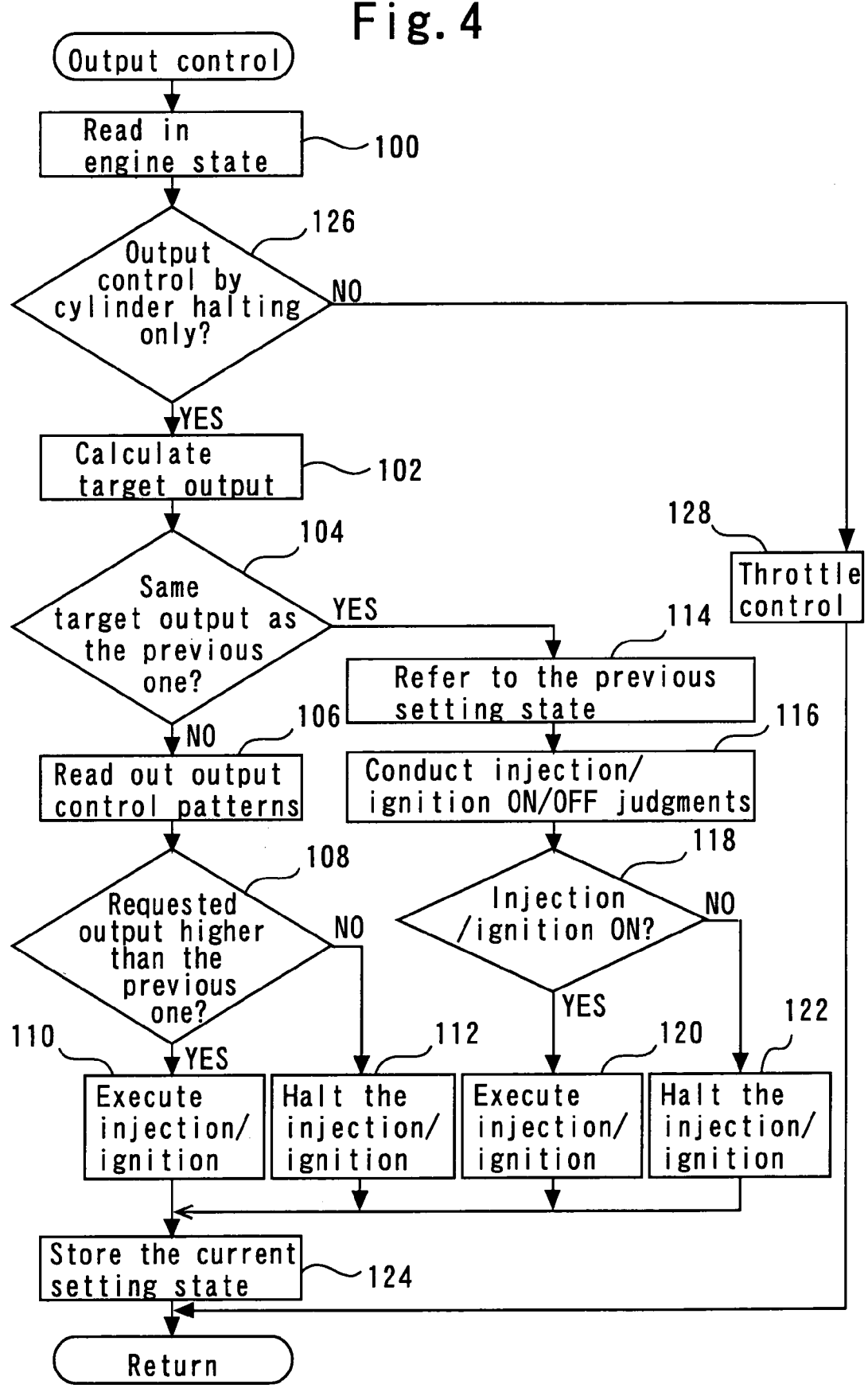
FIG. 4 is a flowchart illustrating a routine that is executed in the second embodiment of the present invention.

FIG. 4 is a flowchart of the output control routine that the ECU 40 shown in FIG. 1 executes to realize the above function in the second embodiment. In FIG. 4, the same reference numeral is assigned to each of the same steps as those of FIG. 3 in the first embodiment, and description of these steps is omitted or simplified.

The routine shown in FIG. 4 is the same as that of FIG. 3, except that steps 126 and 128 are added.

In the routine of FIG. 4, following completion of step 100 in which a current operating state of the internal combustion engine 10 is read in, step 126 is performed to judge from the operating state of the internal combustion engine 10 whether its output is to be controlled using cylinder halting.

Figure 5:
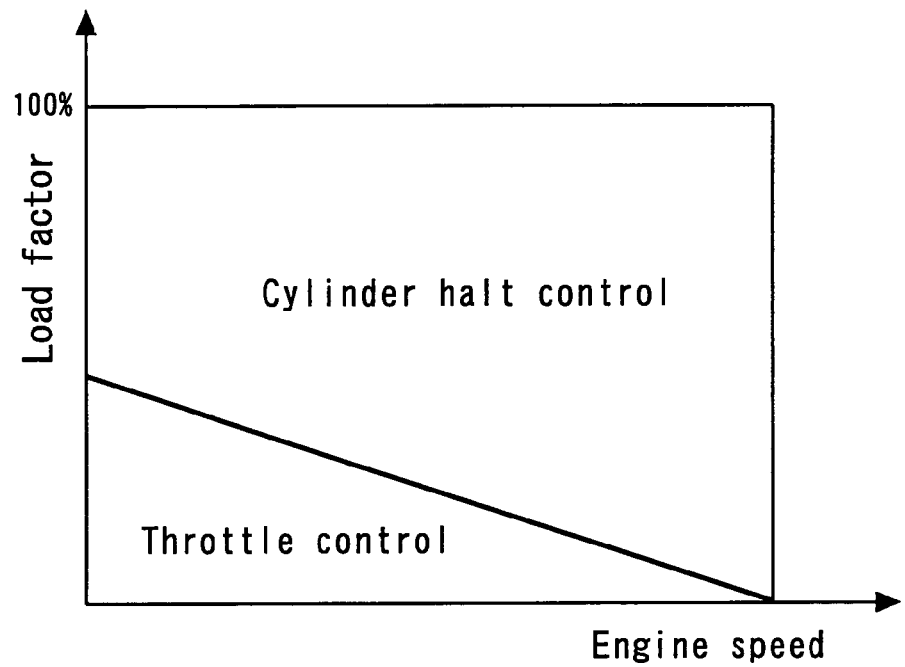
FIG. 5 is an example of a map referred to identify the output control region in the routine shown in FIG. 4.

FIG. 5 shows an example of a map stored within the ECU 40 to identify the output control region. The map shown in FIG. 5 includes a region in which the output is controlled only by cylinder halting with a throttle valve 20 set to be in a fully open state, and a region in which an intake rate of air is controlled by throttle angle adjustment to control the output. In this map, the region where the output is controlled only by cylinder halting is set to span a lower-load region at higher engine speed. In addition, in this map, any low-load engine speed region other than the region in which the output is controlled by cylinder halting is set to become the region in which the output is controlled by throttle angle adjustment. In accordance with this map, the ECU 40 is adapted so that when a low output is requested, output control is conducted only by cylinder halting, i.e., by increasing a ratio of the number of combustion halts to the number of combustion execution cycles, as the engine speed increases. With the map of FIG. 5, therefore, when a low output is requested, the region where output control based only on cylinder halting is executable can be determined more accurately than in the system of the first embodiment.

If it is judged in above step 126 that output control is to be conducted only by cylinder halting, process step 104 onward is performed.

Conversely, if output control is judged not to be conducted by cylinder halting only, step 128 is performed to conduct output control by throttle angle adjustment.

According to the above-described routine of FIG. 4, output control based only on cylinder halting can be implemented in a wider load region as the engine speed increases.

In the second embodiment described above, while output control by throttle angle adjustment is conducted in a low-load engine speed region, output control by throttle angle adjustment and output control based on cylinder halting may be combined with each other in this region. Additionally, the air intake rate is not adjusted only by adjusting an opening angle of the throttle valve 20, and instead of this method or along with adjustment of the throttle valve 20, the air intake rate may be adjusted by modifying valve body opening characteristics of the throttle valve.

In the second embodiment described above, the ECU 40 realizes the "operating region selection unit" mentioned in the second aspect of the present invention, by performing above process step 126. Also, the throttle valve 20 is equivalent to the "air quantity adjusting unit" mentioned in the second aspect of the present invention.

Third Embodiment

Next, a third embodiment of the present invention is described below with reference to FIGS. 6 to 8.

In a system of the present embodiment, output control based on the same control technique of the first embodiment (the routine of FIG. 3) is realized using the system configuration of the first embodiment.

The system of the present embodiment is characterized in that in a cylinder whose internal combustion is halted, any pump loss occurring in the halted cylinder is changed (controlled) by changing the valve timing used for that halted cylinder during a period of its internal combustion halt. According to the system of the present embodiment, changing any pump loss occurring in the halted cylinder makes it possible to alleviate any torque fluctuations and vibration occurring in an internal combustion engine 10 during the cylinder halt. Pump loss can also be prevented from occurring in the halted cylinder.

Figure 6:
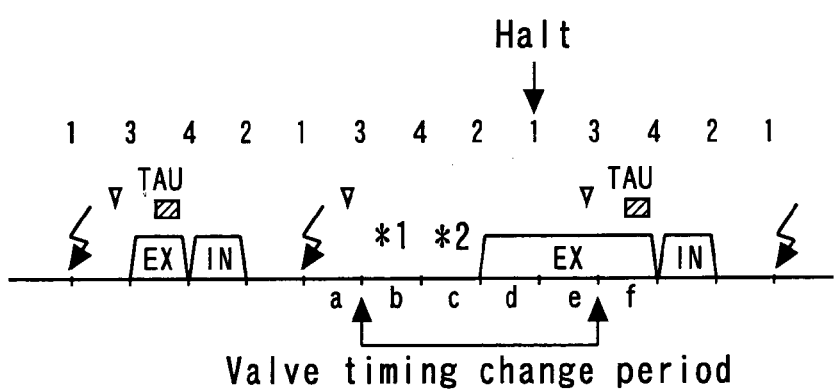
FIG. 6 is a timing chart showing an example of the valve timing used for a halted cylinder when combustion thereof is halted once.

FIG. 6 is a timing chart showing an example of the valve timing used for a halted cylinder when combustion thereof is halted once. For convenience of explanation, the example in FIG. 6 assumes a halt of a first cylinder in the internal combustion engine 10 having four cylinders. The scale graduations shown on a horizontal axis in FIG. 6 are associated with strokes of the engine, and part of the strokes cited in the description are each marked as a specific symbol within a range from "a" to "f". Also, the waveform shown with symbol EX or IN indicates an opening period of an exhaust valve 32 or an intake valve 28, respectively. Additionally, a hatched rectangle with symbol TAU denotes execution timing of fuel injection, symbols each marked with an arrow at a leading end of a polygonal line denote ignition timing, and the numerals shown above the symbols indicative of the ignition timing denote cylinders in which ignition is conducted during execution of respective strokes. Furthermore, inverse triangles indicate the ON/OFF judgment timing that arrives in the first cylinder.

As shown in FIG. 6, when combustion is halted once, four strokes ("b" to "e") intervene during a period from an end of expansion stroke "a" of the cylinder before it is halted, to a start of exhaust stroke "f" executed to prepare for the next combustion. The above four strokes, unlike those occurring during normal execution of combustion, are equivalent to a period during which valve timing can be freely changed. Hereinafter, this period is referred to as "valve timing change period", and the valve timing set during this period is referred to as "combustion halt valve timing".

A change from the valve timing used for normal execution of combustion, to combustion halt valve timing, is implemented by executing a routine similar to that shown in FIG. 3. More specifically, the valve timing change is realized by, in a routine similar to that of FIG. 3, selecting normal valve timing when fuel injection and ignition are executed (see the description of steps 110, 120), and selecting combustion halt valve timing when fuel injection and ignition are halted (see the description of steps 112, 122).

In the example of FIG. 6, for the first two strokes "b" and "c" during the valve timing change period, the intake valve 28 and the exhaust valve 32 are maintained in a closed state from the expansion stroke "a" of the cylinder before it is halted. For the next two strokes "d" and "e", only the exhaust valve 32 is maintained in an open state. The exhaust valve 32 at this time is set to open in the timing when an internal pressure of the cylinder equals an atmospheric pressure.

Figure 7:
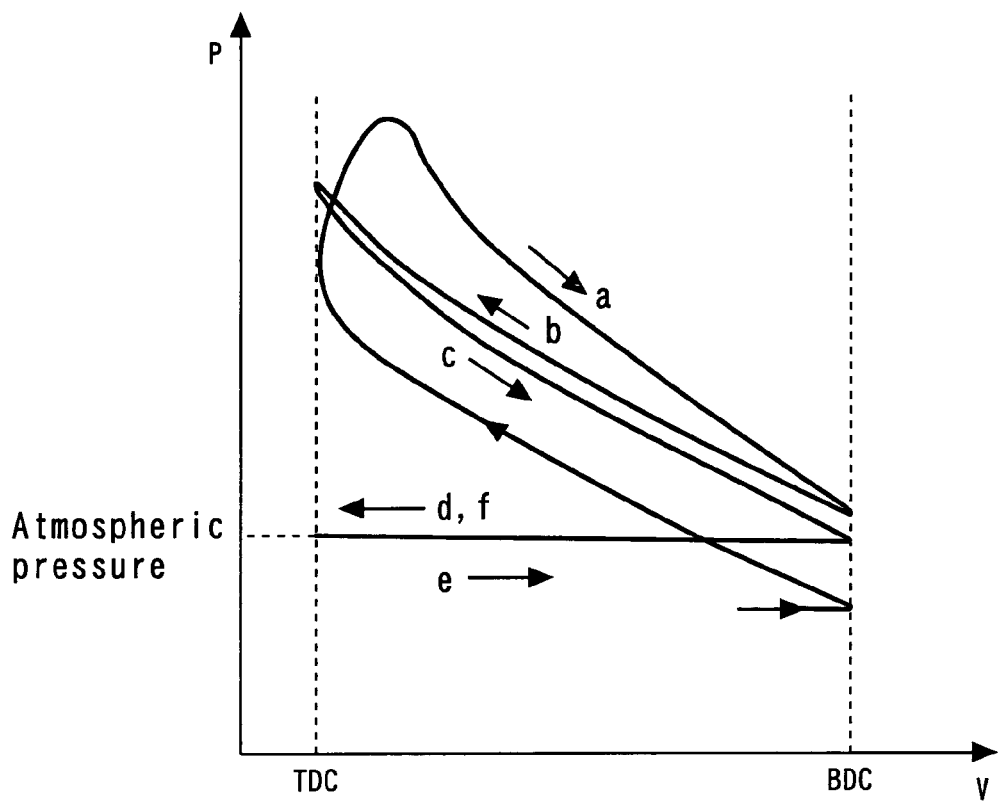
FIG. 7 is a P-V diagram representing a relationship between the in-cylinder pressures P and V attained when valve timing is changed to that shown in FIG. 6.
Figure 8:
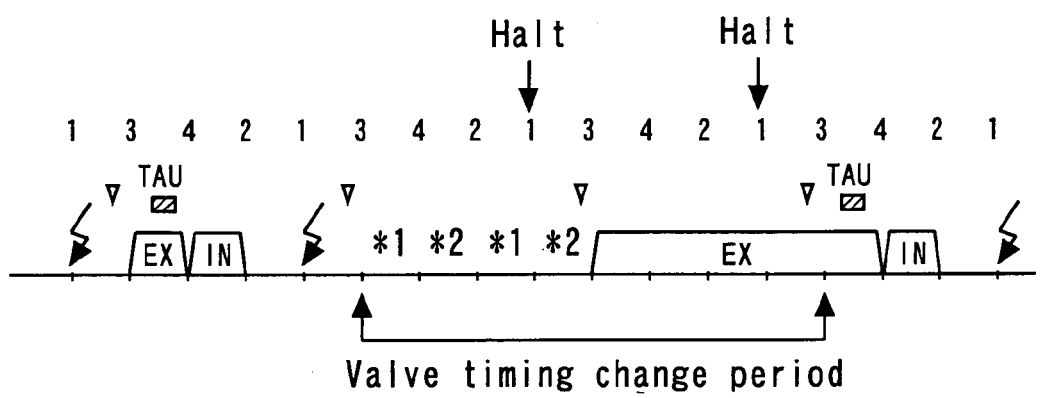
FIG. 8 is a timing chart showing an example of the valve timing used for the cylinder halted when combustion thereof is halted twice in succession.

FIG. 7 is a P-V diagram representing a relationship between the in-cylinder pressures P and V attained when valve timing is changed to that shown in FIG. 6. Symbols "a" to "f" in FIG. 7 are assigned to the associated strokes in FIG. 6.

According to the above combustion halt valve timing, the intake valve 28 and the exhaust valve 32 are both closed during strokes "b" and "c". At this time, in-cylinder pressure P, as shown in FIG. 7, is increased by the recompression conducted after the end of before-halt expansion stroke "a", and then reduced once again by re-expansion. The differential pressure in FIG. 7, caused when the recompression and the re-expansion are conducted, is equivalent to the amount of blow-by gas occurring.

According to the above combustion halt valve timing, the exhaust valve 32 is opened in the timing when in-cylinder pressure P equals the atmospheric pressure. During the strokes "d" and "e" that follow the above, only the exhaust valve 32 is opened. At this time, in-cylinder pressure P changes under the situation where it almost equals the atmospheric pressure, and after flowing out into an exhaust passageway 18, the gas inside the cylinder is taken into the combustion chamber 14 once again. The re-intake of the gas is further flowing out into the exhaust passageway 18 by execution of exhaust stroke "f" in preparation for the next combustion.

As described above, according to the above combustion halt valve timing in the present embodiment, the torque fluctuations and vibration resulting from the cylinder halt can be minimized by recompressing and re-expanding the internal gas of the cylinder. This is further detailed below. Under the control conducted during the halt state of the combustion, the compression work that the halted cylinder performs during the recompression can be used as the force that alleviates the vibration occurring when explosion strokes are conducted in other cylinders. Additionally, the force that pushes a piston downward during following cylinder halts when the recompressed gas inside the cylinder is expanded can be used as assist force for pushing out exhaust after execution of the above explosion strokes in other cylinders. In this case, the above advantageous effects can be obtained while, at the same time, suppressing to zero as the total work performed by the halted cylinder during recompression and re-expansion periods.

According to the combustion halt valve timing in the present embodiment, since the intake valve 28 and the exhaust valve 32 are both closed during the required periods that follow completion of the execution of the before-halt expansion stroke, a period during which the gas inside the cylinder can be sufficiently oxidized in a high-temperature state can be secured and HC emissions can be reduced. At this time, since compression is in progress inside the halted cylinder, a temperature of the gas inside the cylinder can also be prevented from easily decreasing. This advantageous effect, in turn, is useful for preventing a catalyst from being inactivated when the gas later flows out into the exhaust passageway 18.

According to the combustion halt valve timing in the present embodiment, pump loss can be prevented from occurring, because the exhaust valve 32 is opened in the timing when in-cylinder pressure P equals the atmospheric pressure, and because the exhaust valve 32 is opened over the following halt period. Use of such valve timing control makes it possible to cause neither positive nor negative work in the cylinder whose internal combustion has been halted, and thus to implement the output control technique of the present embodiment even more accurately.

According to the combustion halt valve timing in the present embodiment, the intake valve 28 is maintained in a closed condition during the valve timing change period. Such setting makes it possible to prevent fresh air not exposed to combustion, from being newly introduced into the cylinder during a halt period of the combustion, and to prevent other cylinders from disturbing the amount of air taken into the particular cylinder.

Next, a case in which combustion is halted twice in succession is described below with reference to FIG. 8. FIG. 8 is a timing chart showing an example of the valve timing used for the cylinder halted when combustion thereof is halted twice in succession. When combustion is halted twice in succession, a valve timing change period for two cycles, i.e., eight strokes, is inevitably present.

In the cylinder where combustion has been halted, when recompression and re-expansion are repeated, this increases the amount of blow-by gas occurring. In the example of FIG. 8, therefore, the number of times the recompression and the re-expansion are repeatedly performed during the valve timing change period is set to 2. After that, similarly to a case in which combustion is halted once, only the exhaust valve 32 is opened to prevent the occurrence of pump loss during the four strokes that follow completion of opening of the exhaust valve 32 in the timing when in-cylinder pressure P equals the atmospheric pressure. According to the particular valve timing, it is possible to suppress the occurrence of torque fluctuations and vibration, caused by the cylinder halt, while, at the same time, suppressing the amount of blow-by gas occurring. The number of recompressions and re-expansions is not limited to two, and this number may be three or more within a range in which increases in the amount of blow-by gas are suppressed.

In the third embodiment described above, during the valve timing change period, the gas inside the cylinder is always recompressed and re-expanded with both the intake valve 28 and the exhaust valve 32 remaining in a closed condition and then only the exhaust valve 32 is opened. However, the valve operations set for changing any pump loss caused in the halted cylinder are not always conducted in that valve operations above described. That is to say, the intake valve 28 and the exhaust valve 32 may, for example, be closed and opened, respectively, over the valve timing change period. Timing in which the exhaust valve 32 is opened/closed during the period may be properly changed allowing for execution timing of expansion and exhaust strokes in other cylinders (not limited to examples of a four-cylinder engine).

In the above-described first to three embodiments, although the intake valve 28 and the exhaust valve 32 are each driven by an independent electromagnetic driving valve, the present invention is not limited to this configuration. That is, a driving mechanism for the intake valve may be a mechanical valve actuator, only if the actuator has a lost-motion mechanism, and a driving mechanism for the exhaust valve may be a mechanical valve actuator, only if the actuator can greatly vary operating angles. And a driving mechanism for the intake valve and/or exhaust valve may be a system which camshafts are driven by electric motors.

The major features and benefits of the present invention described above are summarized as follows:

An output control system of an internal combustion engine according to the first aspect of the present invention includes a variable-valve actuator for changing valve-opening characteristics of a valve body. A control pattern setting unit is provided for setting output control patterns that each consist of combustion execution timing equivalent to a required number of combustion execution cycles, and combustion halt timing equivalent to a required number of combustion halts. An order-of-combustion setting unit which, in accordance with the output control patterns set by the control pattern setting means, sets whether combustion is to be executed with respect to the explosion timing that arrives in each cylinder in order is also provided. A target output setting means is further provided for setting a ratio between the required number of combustion execution cycles and the required number of combustion halts such that a desired target output is obtained.

The second aspect of the present invention may include an air quantity adjusting unit for adjusting an air intake rate. An operating region selection unit having a first operation mode in which an output is primarily controlled by changing the ratio between the required number of combustion execution cycles and the required number of combustion halts, and a second operation mode in which air intake rate control by said air quantity adjusting means is used for output control may be provided. The operating region selection unit may select either the first operation mode or the second operation mode. The operating region selection unit may set so that as an engine speed increases, the first operation mode covers a lower-load region.

In the third aspect of the present invention, the order-of-combustion setting unit may include a combustion execution unit which, when the target output is changed to an output value greater than the previous output value, relates current explosion timing to a part in the output control patterns that indicates that combustion is to be executed. The order-of-combustion setting unit may also include a combustion halt unit which, when the target output is changed to an output value smaller than the previous output value, relates the current explosion timing to a part in the output control patterns that indicates that the combustion is not to be executed.

In the fourth aspect of the present invention, in a cylinder in which combustion is to be halted, during a valve timing change period of the cylinder, any pump loss occurring in the cylinder may be changed by maintaining an intake valve in a closed condition and making a change to opening/closing timing of an exhaust valve.

In the fifth aspect of the present invention, the exhaust valve may be maintained in an opened condition while a piston reciprocates at least once during the valve timing change period.

According to the first aspect of the present invention, output can be controlled by changing the ratio between the number of combustion execution cycles and the number of combustion halts, not by changing the number of specific cylinders to be halted. Thus, according to the present aspect of the invention, the fine control of output that uses cylinder halts can be implemented without being limited by the number of cylinders provided in the internal combustion engine.

According to the second aspect of the present invention, as the engine speed increases, output that uses cylinder halts can be conducted in a wider range of load regions.

According to the third aspect of the present invention, when a target output higher than the previous output value is required, output can be changed to higher loads more smoothly. Additionally, when a target output lower than the previous output value is required, the present aspect of the invention makes it possible for output to be changed to lower loads, while generating a more natural sense of deceleration.

According to the fourth aspect of the present invention, the torque fluctuations and vibration occurring in the internal combustion engine during cylinder halts can be alleviated. Additionally, according to the present aspect of the invention, pump loss can be prevented from occurring in the cylinders halted.

According to the fifth aspect of the present invention, fine output control that uses cylinder halts can be conducted without causing a pump loss in the cylinders in which combustions are in a halt state.

Further, the present invention is not limited to these embodiments, but variations and modifications may be made without departing from the scope of the present invention.

The invention claimed is:

1. An output control system of an internal combustion engine, having a variable-valve actuator for changing valve-opening characteristics of a valve body, said system further comprising:
   control pattern setting means for setting output control patterns that each consist of combustion execution timing equivalent to a required number of combustion execution cycles, and combustion halt timing equivalent to a required number of combustion halts;
   order-of-combustion setting means which, in accordance with the output control patterns set by said control pattern setting means, sets whether combustion is to be executed with respect to the explosion timing that arrives in each cylinder in order; and
   target output setting means for setting a ratio between the required number of combustion execution cycles and the required number of combustion halts such that a desired target output is obtained.

2. The output control system of an internal combustion engine according to claim 1, further comprising:
   air quantity adjusting means for adjusting an air intake rate; and
   operating region selection means having a first operation mode in which an output is primarily controlled by changing the ratio between the required number of combustion execution cycles and the required number of combustion halts, and a second operation mode in which air intake rate control by said air quantity adjusting means is used for output control, said operating region selection means selecting either said first operation mode or said second operation mode;
   wherein said operating region selection means sets so that as an engine speed increases, said first operation mode covers a lower-load region.

3. The output control system of an internal combustion engine according to claim 1, wherein said order-of-combustion setting means further includes:
   combustion execution means which, when the target output is changed to an output value greater than the previous output value, relates current explosion timing to a part in the output control patterns that indicates that combustion is to be executed; and
   combustion halt means which, when the target output is changed to an output value smaller than the previous output value, relates the current explosion timing to a part in the output control patterns that indicates that the combustion is not to be executed.

4. The output control system of an internal combustion engine according to claim 1, wherein, in a cylinder in which combustion is to be halted, during a valve timing change period of the cylinder, any pump loss occurring in the cylinder is changed by maintaining an intake valve in a closed condition and making a change to opening/closing timing of an exhaust valve.

5. The output control system of an internal combustion engine according to claim 1, wherein said exhaust valve is maintained in an opened condition while a piston reciprocates at least once during said valve timing change period.

6. An output control system of an internal combustion engine, having a variable-valve actuator for changing valve-opening characteristics of a valve body, said system further comprising:
   control pattern setting unit for setting output control patterns that each consist of combustion execution timing equivalent to a required number of combustion execution cycles, and combustion halt timing equivalent to a required number of combustion halts;

order-of-combustion setting unit which, in accordance with the output control patterns set by said control pattern setting unit, sets whether combustion is to be executed with respect to the explosion timing that arrives in each cylinder in order; and target output setting unit for setting a ratio between the required number of combustion execution cycles and the required number of combustion halts such that a desired target output is obtained.

7. The output control system of an internal combustion engine according to claim 6, further comprising:

air quantity adjusting unit for adjusting an air intake rate; and operating region selection unit having a first operation mode in which an output is primarily controlled by changing the ratio between the required number of combustion execution cycles and the required number of combustion halts, and a second operation mode in which air intake rate control by said air quantity adjusting unit is used for output control, said operating region selection unit selecting either said first operation mode or said second operation mode;

wherein said operating region selection unit sets so that as an engine speed increases, said first operation mode covers a lower-load region.

8. The output control system of an internal combustion engine according to claim 6, wherein said order-of-combustion setting unit further includes:

combustion execution unit which, when the target output is changed to an output value greater than the previous output value, relates current explosion timing to a part in the output control patterns that indicates that combustion is to be executed; and combustion halt unit which, when the target output is changed to an output value smaller than the previous output value, relates the current explosion timing to a part in the output control patterns that indicates that the combustion is not to be executed.

9. The output control system of an internal combustion engine according to claim 6, wherein, in a cylinder in which combustion is to be halted, during a valve timing change period of the cylinder, any pump loss occurring in the cylinder is changed by maintaining an intake valve in a closed condition and making a change to opening/closing timing of an exhaust valve.

10. The output control system of an internal combustion engine according to claim 6, wherein said exhaust valve is maintained in an opened condition while a piston reciprocates at least once during said valve timing change period.

* * * * *